(12) United States Patent
Bonnewitz

(10) Patent No.: US 6,336,313 B1
(45) Date of Patent: Jan. 8, 2002

(54) SWIVEL DEVICE FOR SUPPORT WHEELS

(75) Inventor: Bernard Bonnewitz, Vaux (FR)

(73) Assignee: Usines Claas France, St. Remy/Woippy (FR)

( * ) Notice: Subject to any disclaimer, the term of this patent is extended or adjusted under 35 U.S.C. 154(b) by 0 days.

(21) Appl. No.: 09/561,285

(22) Filed: Apr. 28, 2000

(30) Foreign Application Priority Data

Apr. 28, 1999 (DE) .......................................... 199 19 309

(51) Int. Cl.$^7$ ............................................... A01B 73/00
(52) U.S. Cl. .......................................... 56/228; 172/456
(58) Field of Search ........................... 56/228, 385, 384;
172/456, 396, 311, 328, 776, 446, 386;
280/43.16, 86, 86.5, 767, 763.1, 414.5;
180/208, 209; 182/207; 74/522, 103

(56) References Cited

U.S. PATENT DOCUMENTS

| | | | |
|---|---|---|---|
| 2,981,344 A | * 4/1961 | Roberson | 172/386 |
| 3,106,971 A | * 10/1963 | Bushmeyer et al. | 172/386 |
| 3,986,464 A | * 10/1976 | Uppiano | 111/59 |
| 4,034,623 A | * 7/1977 | Boone et al. | 74/522 |
| 4,360,215 A | * 11/1982 | Nohl et al. | 280/413 |
| 4,402,367 A | * 9/1983 | Couser | 172/456 |
| 4,415,043 A | * 11/1983 | Hadler et al. | 172/776 |
| 4,664,202 A | * 5/1987 | Applequist et al. | 172/311 |
| 4,862,758 A | * 9/1989 | Magee | 74/103 |
| 5,054,560 A | * 10/1991 | Foley et al. | 172/248 |
| 5,253,717 A | * 10/1993 | Roush et al. | 172/311 |
| 6,152,240 A | * 11/2000 | Nonhoff et al. | 172/311 |

FOREIGN PATENT DOCUMENTS

| | | |
|---|---|---|
| DE | 18 17 642 | 9/1960 |
| DE | 50 143 | 1/1966 |
| DE | 91 02 354 U1 | 6/1991 |
| DE | 297 13 081 | 7/1997 |

* cited by examiner

Primary Examiner—Robert E. Pezzuto
Assistant Examiner—Árpád Fabián Kovács
(74) Attorney, Agent, or Firm—Husch & Eppenberger, LLC; Robert E. Muir

(57) ABSTRACT

A swivel device is provided for support wheels on front attachments for agricultural machines, in particular for swath pick-up devices on forage harvesters and bale presses. An embodiment includes coupling plates (11) attached to the front free end of the supporting arm (10). Attached to the coupling plates (11) are coupling levers (13, 14), which are connected to swivel plates (15). The swivel plates (15) are connected by a swivel pin (16) to a wheel yoke (17) for receiving the support wheel (7). Between a fixed point on the supporting arm (10) and the coupling lever (14) is arranged a hydraulic cylinder (8).

8 Claims, 4 Drawing Sheets

SWIVEL DEVICE FOR SUPPORT WHEELS

BACKGROUND OF THE INVENTION

The invention relates generally to machinery having implements and, more particularly to a swivel device for support wheels mounted for rotation between stops within a swivel angle, on mounted implements for machines. In particular the swivel device is useful for swath pick-up devices on forage harvesters and bale presses, but also other drawn or mounted implements such as cutterbars, turners, swathers, etc., wherein the support wheels which are connected by supporting arms to the side walls of the front attachment are used for support of the mounted implement on the ground and the support wheels can be swiveled into a position which increases the width of the mounted implement and into a position which decreases the width of the mounted implement.

Mounted implements have support wheels in order on the one hand to support the weight of the mounted implements at least partially on the ground and on the other hand to control movably arranged components of a mounted implement in such a way that the latter in its swivel position copies the ground contour. In this case the support wheels have a mounting for rotation about an essentially vertical axis, so that when travelling round bends the support wheels can adapt to the radius of curvature and do not grind over the ground. To keep the performance quiet and protect operation, the swivel angle is limited by stops to a sensible range, e.g. 45°, so that a support wheel can be pivoted to right and left from the straight-ahead position by 22.5° each. For the possibility of picking up a wide crop swath or for achieving as wide as possible a working width of a mounted implement, the pick-up devices in general have a correspondingly wide width. With the support wheels additionally arranged in both side regions, the pick-up devices and mounted implements achieve a width which can be wider than the width of the remainder of the harvester. As this leads to obstruction on transport journeys in public road traffic or to exceeding the permitted vehicle width, various designs which reduce the width dimensions in the transport position are already known. But in other respects too the extra width from the laterally mounted support wheels can have an adverse effect, for example when maneuvering with the agricultural machine.

Thus for example there is known a front attachment for harvesters (DE 297 13 081 U1) whose support wheels in the transport position are swiveled by a manually triggered swivel movement by means of two or one double swivel bearing through initially 180° into a position behind the front attachment, and then also raised to remove contact with the ground. Although with this design the support wheels in the transport position no longer project from the side wall of the front attachment, both the structural space requirements for this between the rear wall of the front attachment and the front wheels of the harvester, and the necessary expenditure on manual operation, are very high.

SUMMARY OF THE INVENTION

The design according to the invention allows the swivel pin to be held by at least two coupling levers in a position in which the support wheels can continue to run straight ahead in spite of the stops in both end positions. If the coupling levers are swiveled parallel to each other, the degrees of freedom between the two stops, between which the support wheel can turn, are preserved independently of the swivel position. If the coupling levers are attached to a swivel-mounted supporting arm, adjustment of height can be performed as well as lateral swiveling. If the coupling levers can be swiveled about non-vertically mounted swivel bearings, the swivel movement combines lateral displacement of the support wheels with a change of height. Due to hydraulic operation of the swivel device from the driver's cab of the harvester, easy control becomes possible. In case of a combination of the non-vertically mounted swivel bearings with hydraulic operation, by extending the hydraulic cylinders the support wheels can be displaced from a low lateral swivel position to a higher one in front of the mounted implement. In each position between the maximum low lateral position and the maximum higher front position of the support wheels they can support the mounted implement, so that remote-controlled infinitely variable adaptation of the height of the implement is possible due to the arrangement according to the invention. In the transport position too, the support wheels which are swiveled forwards protect the implement from possible collisions with obstacles or from unevenness of the road. All the above advantages can be obtained with slight restrictions with manual operation as well. With a variously controllable extended position of the hydraulic cylinders in combination with non-vertically mounted swivel bearings, active swiveling of the implement supported by the support wheels, possibly regulated by an additional electronic control unit, can be obtained. As a result of the advantageous design of the swivel mechanism and the favorable arrangement of the support wheels, there are low space requirements overall.

In accordance with the present invention there is provided a swivel device for a support wheel of a mounted implement including means for mounting the support wheel for movement between a plurality of stops within a swivel angle. A plurality of supporting arms connect the support wheel to a side wall of the implement. The support wheel are pivotable between a position which increases the overall width of the mounted implement and a position which decreases the overall width of the mounted implement. A plurality of swivelable coupling levers are connected to a swivel pin, and the swivelable coupling levers are connected to a plurality of swivel bearings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
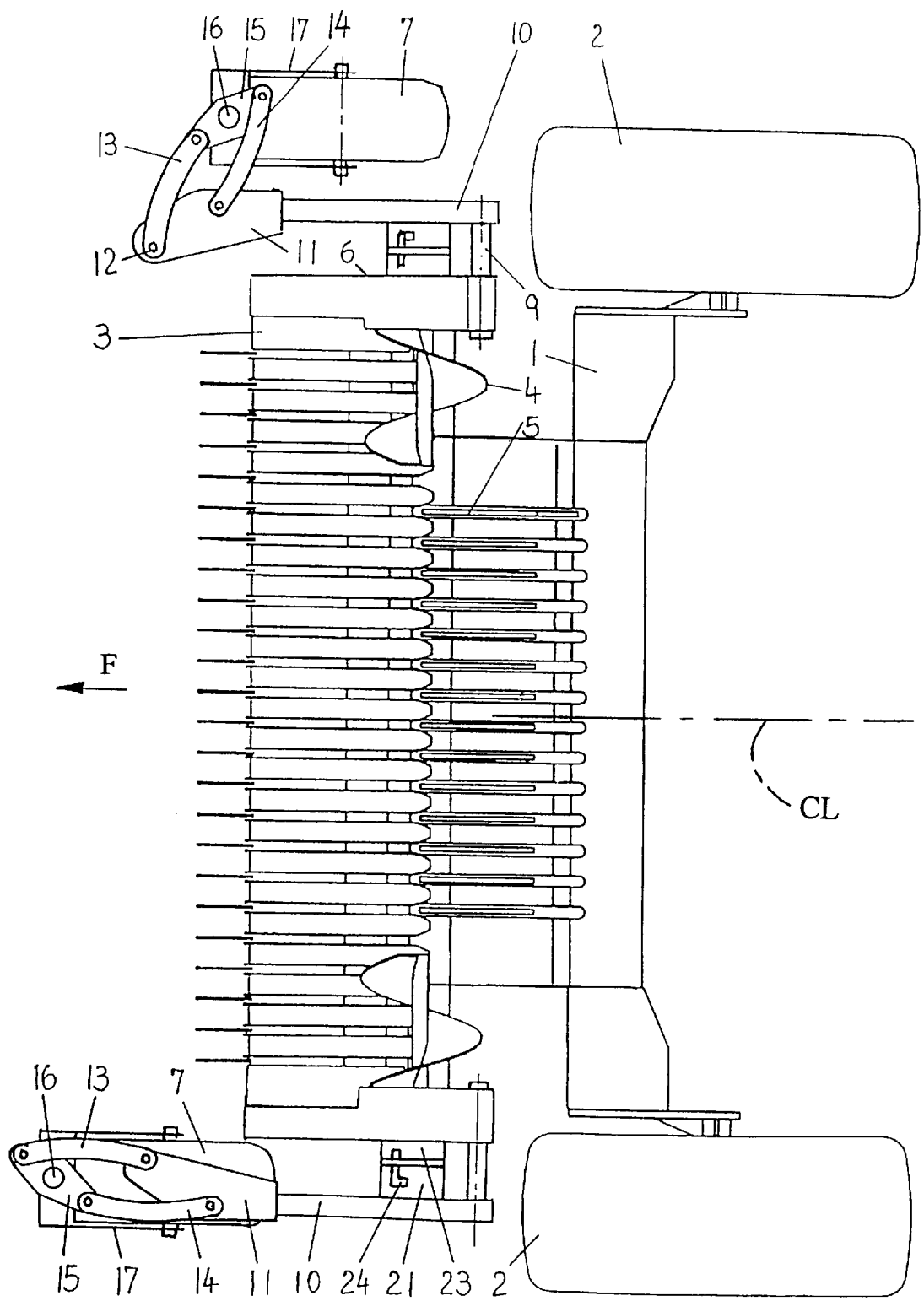
FIG. 1 is a top view of a pick-up drum with support wheels, the support wheel which is on the right in the direction of travel of the harvester being in a working position, and the support wheel which is on the left side being in a transport position.

A machine 1, conveniently a harvester, has only the front portion shown in FIG. 1. An implement in the form of a pick-up drum 3 is mounted in the region in front of the front wheels 2 which carry the machine. A crop deposited in swaths on the ground is picked up by the drum 3 and conveyed into the harvester 1 for further processing. To allow a wide pick-up width, lateral feed augers 4 are arranged in both side regions of the pick-up drum 3, i.e. on either side of the center line CL of the machine 1. The feed augers 4 channel the picked-up crop to the width of the subsequent conveyor device 5.

For support of the pick-up drum 3 on the ground, in the regions adjacent the side walls 6 of the pick-up drum 3 are arranged support wheels 7. These are swiveled each by an associated hydraulic cylinder 8 between a working position and a transport position. Referring to FIG. 1, the support wheel 7 which is on the right in the direction of travel F of the harvester is in a working position, and the support wheel 7 which is on the left is in a transport position. Attached to the side walls 6 of the pick-up drum 3 is a more or less horizontally running journal 9 on which is arranged a supporting arm 10 which can be swiveled in height. Attached to the front free end of the supporting arm 10, which runs parallel to the side wall 6 of the pick-up drum 3, are coupling plates 11 to which are swivelably connected, on stationary bolts 12, to coupling levers 13, 14. The coupling levers 13, 14 are, in turn, connected to swivel plates 15. In addition to the two coupling levers, further coupling levers may be provided, depending what loads are to be picked up and what swivel movements are to be performed. The swivel plates 15 are connected by a generally vertically mounted swivel pin 16 to a wheel yoke 17 for receiving the support wheel 7. The arrangement shown in FIG. 1 can be operated manually.

Figure 2:
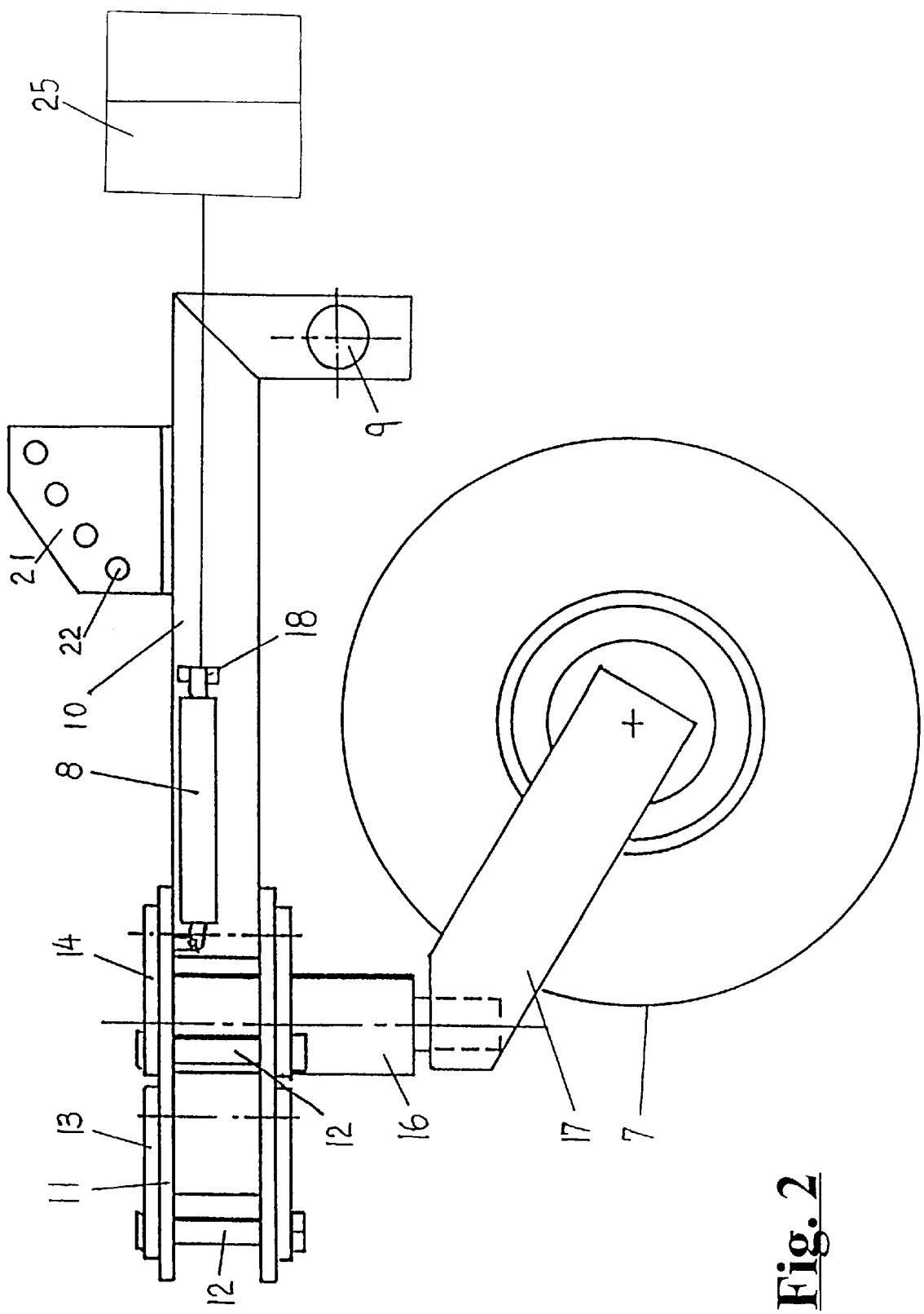
FIG. 2 is a side view of a support wheel in its working position.
Figure 3:
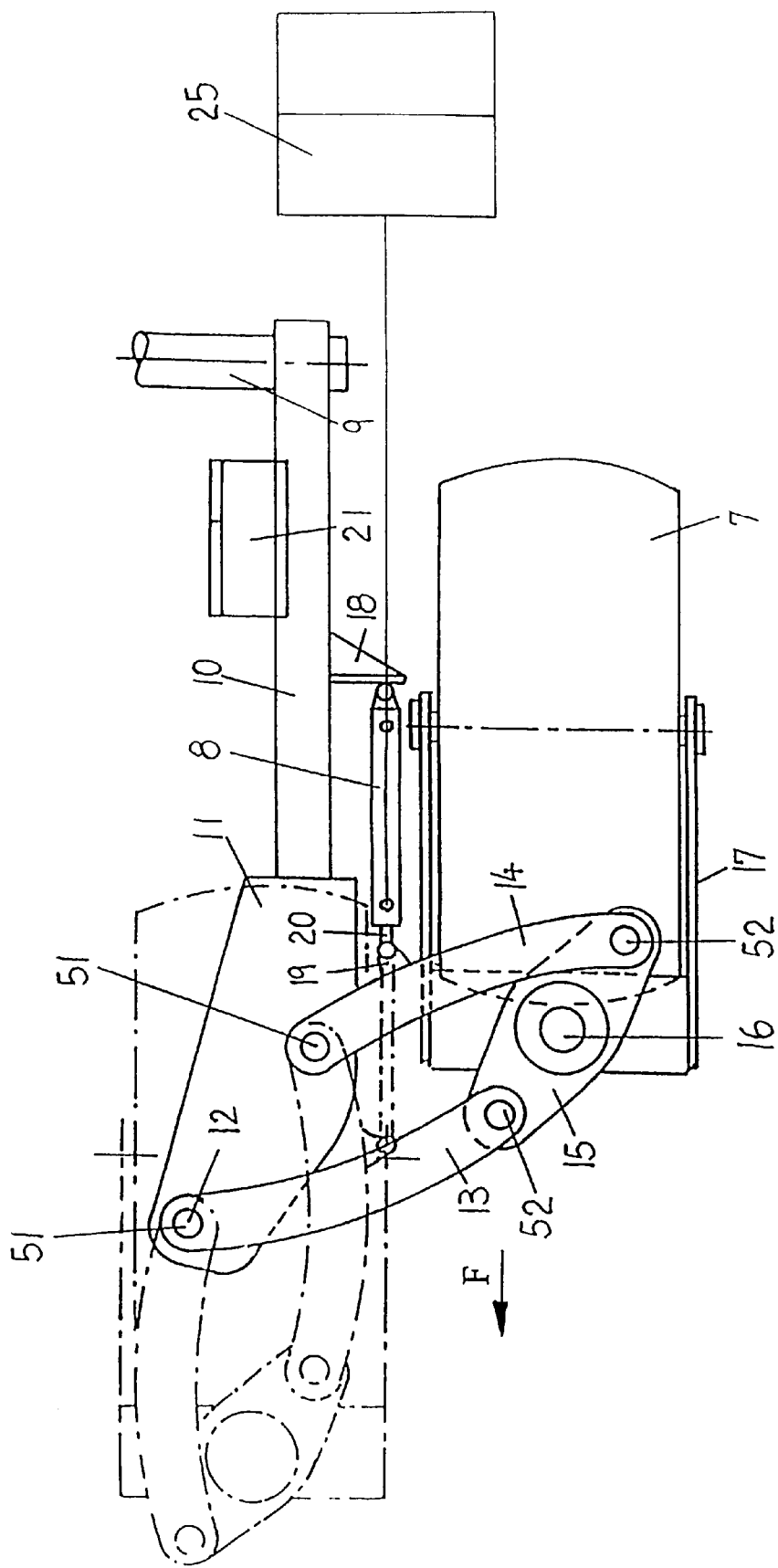
FIG. 3 is a top view of a support wheel, the working position being shown in solid lines and the transport position in phantom lines.

In the FIGS. 2 and 3 embodiment, a hydraulic cylinder 8 is arranged between a lateral support 18 on the supporting arm 10 and a bracket 19 connected to the coupling lever 14. The hydraulic cylinder 8 is operatively connected to the hydraulic system of the harvester 1 through the use of hydraulic valves 25. By operating the hydraulic cylinders 8 from the operator's cab of the harvester 1 or the cab of a tractor, the coupling levers 13, 14 are moved about the stationary bolts 12 attached to the coupling plate 11 and so the swivel plate 15 with the wheel yoke 17 and the support wheel 7 mounted thereon is swiveled in a horizontal plane. In a further embodiment, the stationary bolts 12 may include pins. According to the respective direction of movement of the piston rod 20 of the hydraulic cylinder 8, the support wheel 7 is swiveled into the working position laterally adjacent the pick-up drum 3 or into the transport position in front of the supporting arm 10. Within the swivel range, support of the pick-up drum 3 on the ground by the support wheels 7 is possible in various intermediate positions.

The height of the support wheels 7 is manually adjustable relative to the pick-up drum 3 in the example shown in FIGS. 2 and 3. For this purpose, on the upper side of the supporting arm 10 is arranged an adjusting plate 21 with several drilled holes 22 staggered in height. In the opposite position on the side wall 6 of the pick-up drum 3 is located an identical profile plate 23 which is also provided with drilled holes. By means of a safety pin 24, the adjusting plate 21 is locked to the profile plate 23 in the required position.

Figure 4:
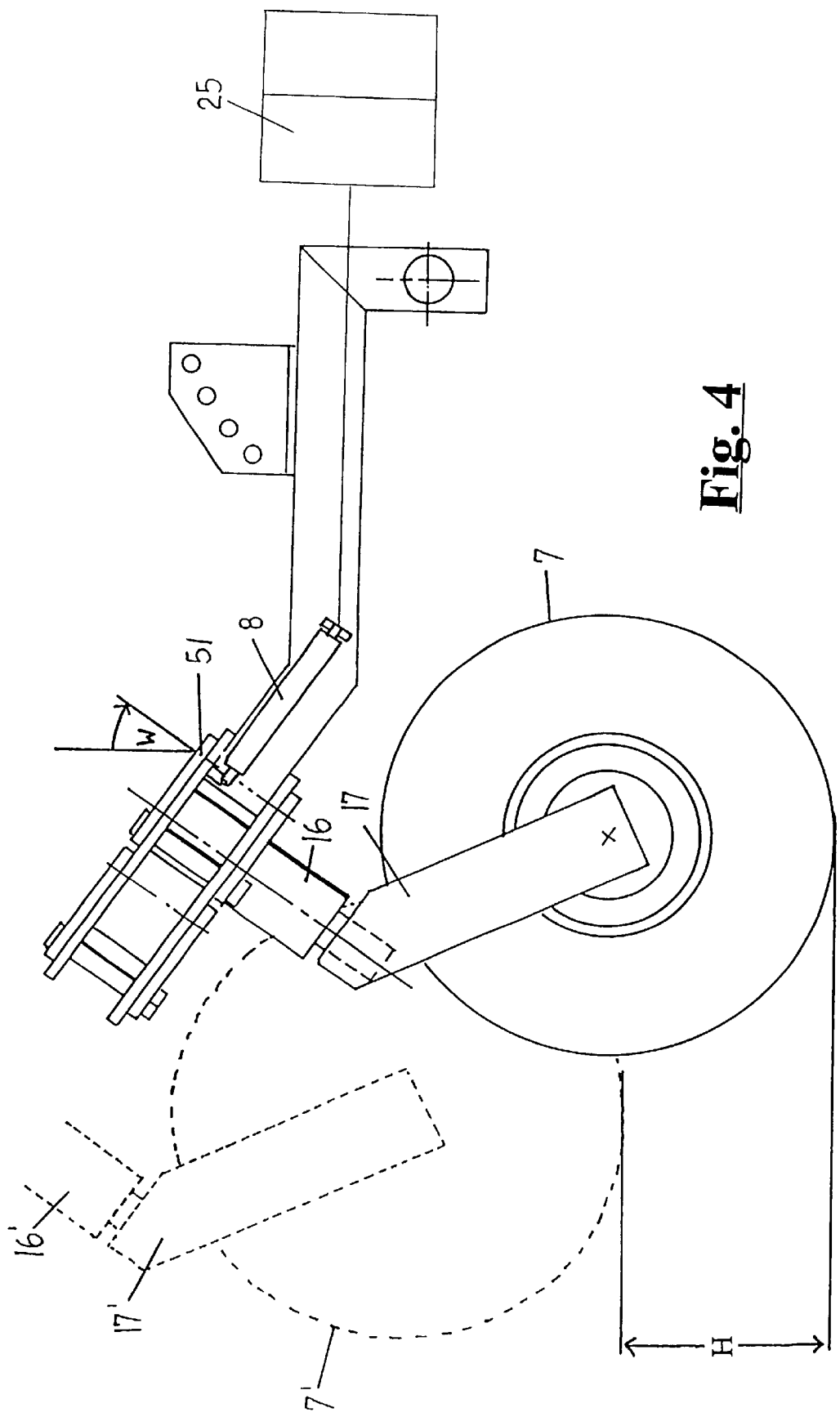
FIG. 4 is a side view of a modification in which a support wheel is displaced in height during swiveling.

FIG. 4 shows another modification. The swivel bearings 51 on the implement side are set at an angle W to the vertical. In this arrangement, when the hydraulic cylinder 8 is operated, the coupling levers 13, 14 are displaced forwardly and upwardly. When the hydraulic cylinder 8 reaches its extended position, the result for the support wheel 7 is an end position which corresponds to the position 7' shown in broken lines. Also the swivel pin 16 and the wheel yoke 17 are displaced into the end positions 16', 17'. Between the two possible end positions, when the swivel bearings 51 and/or 52 are set at the angle W, the support wheel 7 is displaced in height by a height value of H.

The embodiments have been described with a pick-up drum 3 as the mounted implement, which however does not in any way mean that the application of the inventive idea is to be limited to this practical example. It can be transferred to all agricultural implements which are mounted or drawn and which are fully supported or of which only individual components are supported on the ground by support wheels. For instance, turners and swathers or cutterbars of harvesters come under consideration too. Also structural elements described can be replaced or added to by known apparatus, thus for example the single pneumatic tire shown in the practical example can be replaced by a tandem chassis with double arm. Depending on requirements, the coupling levers too can have a different form or spatial position to the one shown in the examples.

While a preferred embodiments of the invention has herein been illustrated and described, this has been done by way of illustration and not limitation, and the invention should not be limited except as required by the scope of the appended

I claim:

1. A swivel device for a support wheel of a mounted implement including: means for mounting the support wheel for movement between a plurality of stops within a swivel angle, at least one supporting arm connecting the support wheel to a side wall of the implement, the support wheel being pivotable into a position which increases the overall width of the mounted implement and into a position which decreases the overall width of the mounted implement, a swivel pin operatively connected to the support wheel and pivotally connected to at least one swivel plate, wherein the at least one swivel plate includes a first end portion and a second end portion, wherein at least one first swivelable coupling lever, which includes a first end portion and a second end portion, wherein the first end portion of the at least one first swivelable coupling lever is connected to the first end portion of the at least one swivel plate and at least one second swivelable coupling lever, which includes a first end portion and a second end portion, wherein the first end portion of the at least one second swivelable coupling lever is connected to the second end portion of the at least one swivel plate and the second end portion of the at least one first swivelable coupling lever is connected to a first end portion of at least one coupling plate and the second end portion of the at least one second swivelable coupling lever is connected to the second end portion of the at least one coupling plate with the at least one coupling plate pivotally connected to the at least one supporting arm.

2. The swivel device in accordance with claim 1, wherein the at least one swivel plate and the at least one coupling plate about which the at least one first swivelable coupling lever and the at least one second swivelable coupling lever are swivelable are arranged spatially in such a way that the at least one first swivelable coupling lever and the at least one second swivelable coupling lever lie parallel to each other in every swivel position.

3. The swivel device in accordance with claim 1, wherein the mounted implement is supportable in every position by a plurality of support wheels within the swivel range of the support wheel between the position which increases the width of the mounted implement and the position which decreases the width of the mounted implement.

4. The swivel device in accordance with claim 1, wherein the support wheel in the position which decreases the width of the mounted implement is swivelable in front of the at least one supporting arm.

5. The swivel device in accordance with claim 1, wherein the at least one first swivelable coupling lever and the at least one second swivelable coupling lever are swivelable about non-vertically mounted the at least one swivel plate and the at least one coupling plate.

6. The swivel device in accordance with claim 1, wherein between a support laterally attached to the at least one supporting arm and a bracket connected to the at least one first swivelable coupling lever and the at least one second swivelable coupling lever includes a hydraulic cylinder.

7. The swivel device in accordance with claim 6, further including a hydraulic cylinder which is movable by corresponding hydraulic valves into a plurality of extended positions.

8. A swivel device on a front attachment of a mounted implement: means for supporting the mounted implement mounted for rotation between a plurality of stops within a swivel angle, a plurality of supporting arms connecting the means for supporting the mounted implement to a side wall of a front attachment, the means for supporting the mounted implement being pivotable into a position which increases the width of the mounted implement and into a position which decreases the width of the mounted implement, a swivel pin operatively connected to the support wheel and pivotally connected to at least one swivel plate, wherein the at least one swivel plate includes a first end portion and a second end portion, wherein at least one first swivelable coupling lever, which includes a first end portion and a second end portion, wherein the first end portion of the at least one first swivelable coupling lever is connected to the first end portion of the at least one swivel plate and at least one second swivelable coupling lever, which includes a first end portion and a second end portion, wherein the first end portion of the at least one second swivelable coupling lever is connected to the second end portion of the at least one swivel plate and the second end portion of the at least one first swivelable coupling lever is connected to a first end portion of at least one coupling plate and the second end portion of at least one second swivelable coupling lever is connected to the second end portion of the at least one coupling plate with the at least one coupling plate pivotally connected to the at least one supporting arm.

* * * * *